United States Patent [19]

Inciong et al.

[11] Patent Number: 4,597,583
[45] Date of Patent: Jul. 1, 1986

[54] GASKET ASSEMBLY FOR SEALING COVERS TO AUTOMOTIVE ENGINES

[75] Inventors: Josefino T. Inciong, Des Plaines; Frank L. Miszczak, Frankfort, both of Ill.

[73] Assignee: Felt Products Mfg. Co., Skokie, Ill.

[21] Appl. No.: 752,616

[22] Filed: Jul. 8, 1985

[51] Int. Cl.⁴ ............................................. F16J 15/12
[52] U.S. Cl. ................ 277/235 B; 277/166; 277/211
[58] Field of Search ............... 277/166, 167.5, 207 R, 277/211, 228, 235 B

[56] References Cited

U.S. PATENT DOCUMENTS

| | | | |
|---|---|---|---|
| 2,058,010 | 10/1936 | Fitch | 277/235 B X |
| 2,815,549 | 12/1957 | Olson | 277/167.5 X |
| 3,930,656 | 1/1976 | Jelinek | 277/211 X |
| 4,192,520 | 3/1980 | Hasegawa | 277/235 B |
| 4,368,894 | 1/1983 | Parmann | 277/166 |

FOREIGN PATENT DOCUMENTS 2372321  6/1978  France ........................... 277/235 B

*Primary Examiner*—Robert S. Ward
*Attorney, Agent, or Firm*—Dressler, Goldsmith, Shore, Sutker & Milnamow

[57] ABSTRACT

An oil pan cover or the like and gasket assembly for juxtaposition with a member to be sealed thereby, the cover providing a surface defining a sealing flange adapted to confront the surface of a member to be sealed, the flange surface defining an elongated groove for receiving the gasket assembly. The groove is T-shaped and includes a first internal groove section and a second wider groove section intersecting the surface of the flange. The gasket assembly is T-shaped and has an elongated body generally complementary in configuration to the groove, and includes a first elongated elastomeric sealing section adapted to be positioned and compressed between the wider groove section and the member to provide a seal therebetween, and a second elastomeric rigidifying bead, the sealing section and the bead being integrally molded, and a reinforcing wire fast with the rigidifying bead to rigidify the elongated body.

10 Claims, 3 Drawing Figures

GASKET ASSEMBLY FOR SEALING COVERS TO AUTOMOTIVE ENGINES

BACKGROUND OF THE INVENTION

This invention relates to improved gaskets, especially for use with oil pan and rocker covers for sealing them to automotive engines.

To seal oil pan and rocker covers as of die cast aluminum, molded elastomeric gaskets of an "O" ring type are commonly used. They are frequently generally circular in cross-section. Alternatively, such gaskets may comprise at least one parti-circular circumferential portion and generally flattened sides and bottom. To hold such "O" ring-type gaskets in place with the cover for installation, they may be provided with longitudinally spaced, slightly projecting, pairs of friction-type installation tabs which are designed to bear against the opposite sides of a groove in which such a gasket is positioned. The grooves in which such "O" ring-type gaskets are positioned are generally rectangular in cross-section. The grooves are located in the flange of the oil pan or rocker cover and open at the surface of the flange. After insertion of such a gasket in the groove, the cover is juxtaposed with the engine and the flange is bolted thereto with the gasket, which projects slightly beyond the surface of the flange, being in sealing engagement between the flange and the confronting engine surface, thereby to provide a seal.

Because such gaskets are elastomeric, they are usually limp and highly flexible. A number of difficulties of installation result from the use of such gaskets. For example, when a rubber "O" ring-type gasket is to be installed, as in the groove of an oil pan cover flange, it tends to stretch slightly. Thus, when one reaches the end of the endless gasket being installed, a bulge frequently is produced requiring either removal and reinsertion of the gasket, or further manipulation to "spread" the bulge. Further, limp gaskets must be installed by hand and cannot be installed mechanically, as by a robot.

One possible solution to some of these problems would be to provide a molded rubber gasket with a rigid core, such as a metallic wire core or other stiffener. This would provide a gasket of fixed dimensions and length and with sufficient rigidity for a robot to handle and insert the gasket appropriately. However, when such gaskets are in placed and fasteners are positioned and tightened, any excess of torquing load would tend to split the rubber adjacent to the edge of the wire, the gasket would then lose its integrity, and the gasket would tend to fail as an adequate seal. Further, because the sealing flange of the typical oil pan cover is relatively flexible, the fasteners must be pulled down tightly to maintain the seal between the cover and the engine. Even if the torque applied to the fasteners is controlled, it is not realistically possible to prevent rubber splitting. Hence, the typical molded rubber "O" ring-type gasket with a rigid core, such as a metallic wire, is not fully suitable as an effective oil pan cover gasket, and the careful control of torquing loads is not a fully effective solution.

An improved gasket for use in an "O" ring-type gasket environment with improved sealing characteristics, and which may be mechanically installed rather than manually installed, is highly to be desired.

SUMMARY OF THE INVENTION

In accordance with the present invention, a cover and gasket assembly for juxtaposition with a member, such as an engine, to be sealed thereby is provided. The cover may be an oil pan or rocker cover for juxtaposition with the member to be sealed thereto.

The cover provides a surface defining a sealing flange adapted to confront the surface of the member to be sealed and the flange surface defines an elongated groove for receiving the gasket assembly. The elongated groove comprises a first internal groove section and a second wider groove section intersecting the surface of the flange, and the wider groove section defines shoulder means adjacent the internal groove section. In a preferred form the gasket assembly comprises an elongated body generally complementary in configuration to the elongated groove and includes a first elongated elastomeric sealing section adapted to be positioned and compressed between the cover groove shoulder and a member to be sealed thereto to provide a seal therebetween, and a second elastomeric rigidifying bead. The sealing section and the sealing bead are integrally molded, and the bead is disposed at an angle to the sealing section. A stiffening element fast with the rigidifying bead is provided to rigidify the elongated body. The stiffening element is out of the zone of the sealing section.

The body and groove are desirably each T-shaped in cross-section, with the bead comprising the stem of the "T" of the body. The stiffening element is preferably encapsulated within the bead out of the zone of the sealing section and may be a reinforcing wire. Auxiliary sealing beads may be provided on the sealing section and projecting from opposite sides thereof to enhance the sealing effect of the sealing section.

Further objects, features, and advantages of the present invention will become apparent from the following description and drawings.

DESCRIPTION OF THE PREFERRED EMBODIMENTS

Figure 1:
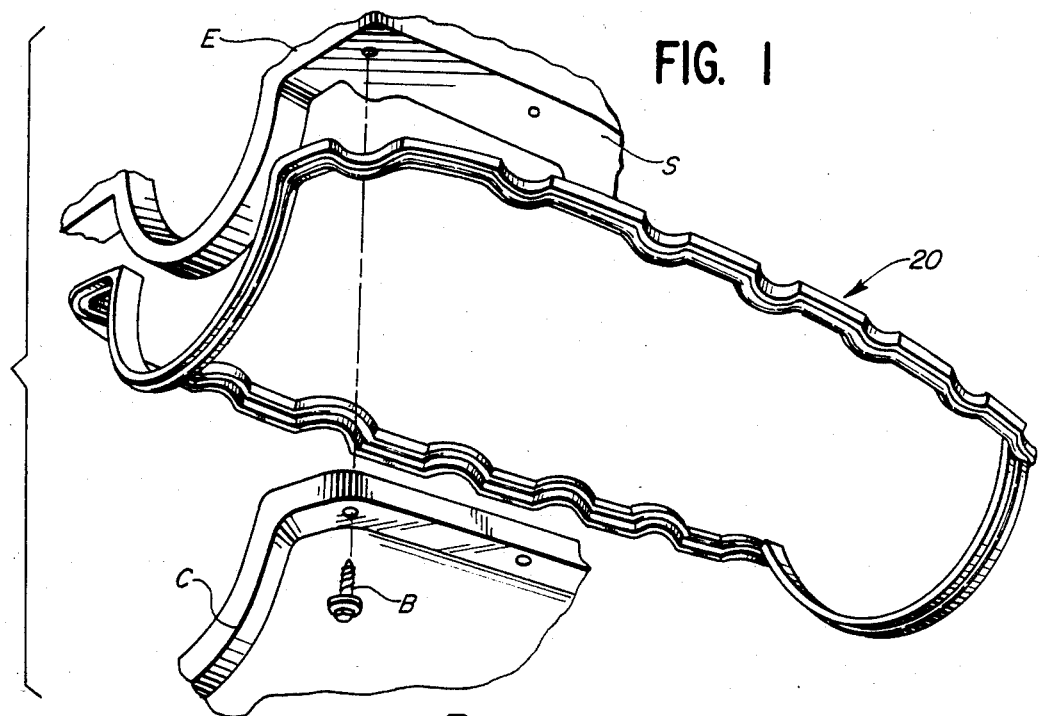
FIG. 1 is an exploded perspective view of a gasket assembly of the present invention juxtaposed with an engine and an oil pan cover.

Referring now to the drawings, FIG. 1 shows an engine E and an oil pan cover C adapted to be sealingly secured to the engine. Oil pan cover C may be of die cast aluminum and provides a flange F proportioned to confront a complementary engine surface S. A sealing gasket 20 provides a seal between surface S and flange F.

Figure 2:
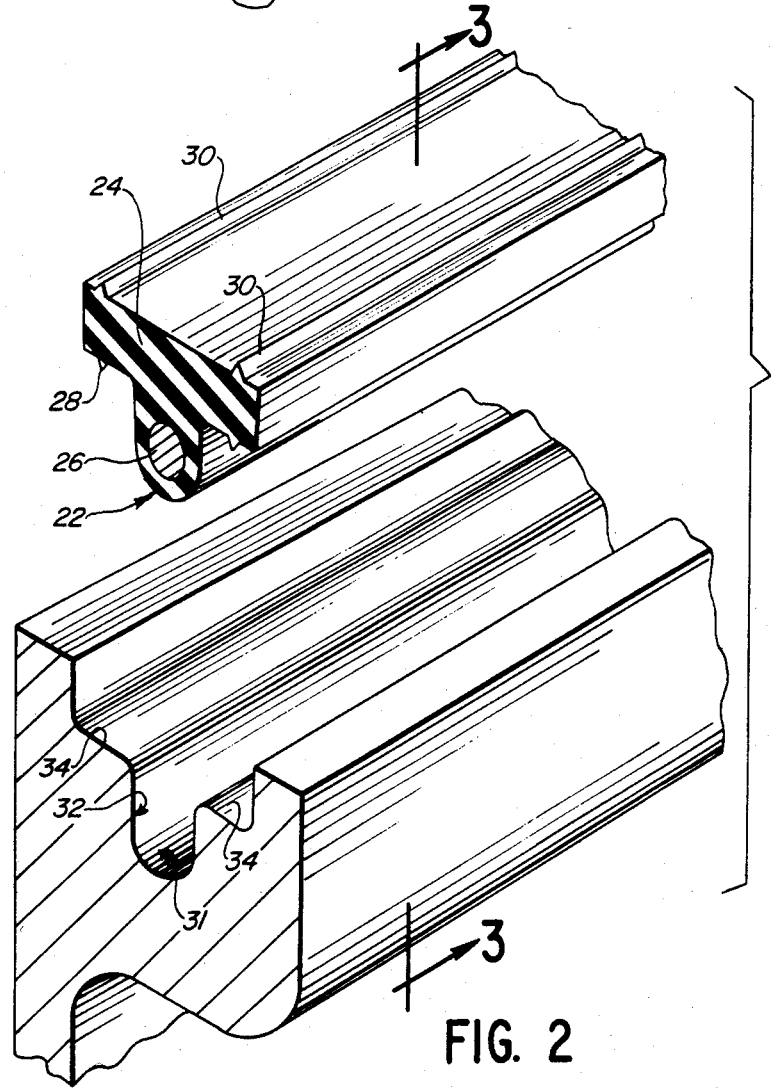
FIG. 2 is an exploded fragmentary view of the gasket assembly and oil pan cover of FIG. 1.
Figure 3:
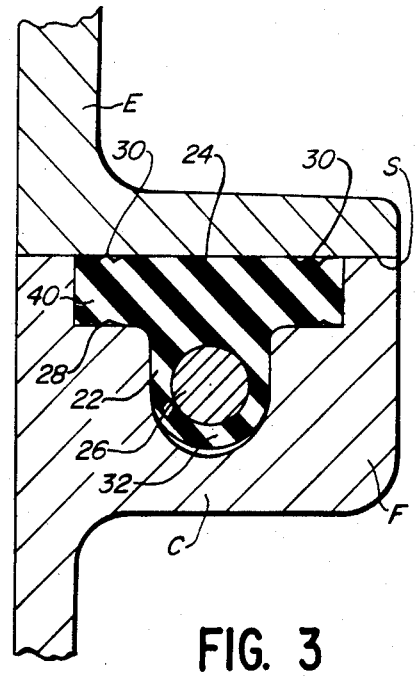
FIG. 3 is a cross-sectional view taken generally along line 3—3 of FIG. 2.

Sealing gasket 20 comprises an elongated elastomeric body and is endless. It may comprise a pair of generally longitudinally extending sides and a pair of arched end portions, all shaped to conform to the configuration of the oil pan cover C. As best seen in FIG. 2, sealing gasket 20 is integrally molded and comprises a first rigidifying bead 22 and a second sealing section 24. The bead is disposed at an angle to the sealing section 24. Rigidifying bead 22 comprises a generally upstanding elastomeric, continuous element. A stiffening element is fast with the bead 22. In the embodiment shown, the bead 22 encapsulates the stiffening element which comprises a reinforcing wire 26. Wire 26 may be a steel wire and may be continuous throughout the length of gasket 20, or may be segmental, such as along all or portions of the sides of the gasket. As best seen in FIG. 3, the stiffening element 26 is out of the zone of the sealing section 24. However, it serves to rigidify the bead, hence to rigidify the entire gasket 20.

The sealing section 24 of gasket 20 is continuous and is preferably formed integrally, as by molding, with bead 22. In the form shown, section 24 is generally rectangular in cross-section and, with bead 22, is T-shaped in cross-section with the bead comprising the stem of the "T". Section 24 is elastomeric. A typical suitable elastomer is silicone rubber. Section 24 is provided with continuous elongated auxiliary sealing beads 28, 30 which project from opposite sides of the sealing section and which supplement and augment the sealing qualities of gasket 20. Beads 28, 30 may preferably be generally V-shaped and are positioned to bear, respectively, against the flange of cover C and the surface S of the engine E.

The oil pan cover surface is formed with an elongated retention groove 31 in the sealing flange thereof. The formation of a groove 31 requires little additional machining or fabrication as compared to prior art grooves for receiving "O" rings or the like. Rather then being generally rectangular as are the grooves typically used with more conventional "O" ring-type sealing gaskets used in such environments, the retention groove 31 is generally T-shaped in transverse cross-section and is generally complementary in configuration to the T-shaped sealing gasket 20. Thus, it is seen that flange F defines a first internal or upper groove section 32 (the stem of the "T") proportioned to receive bead 22, preferably in a friction fit, thereby to retain bead 22, hence gasket 20, in its desired relationship with the oil pan cover. Section 32 has sufficient height so that when bead 22 is seated therein, sealing section 24 and the beads 28 are disposed against confronting groove shoulders or walls 40 in the second wider groove section 34 which intersects the flange surface, all so that sealing may be effected thereat when sealing section 24 is placed under compression between the engine E and groove shoulders or walls 40.

It will be seen that when the cover C and engine E are juxtaposed and the sealing gasket 20 is positioned and compressed between the engine E and groove walls 40 via fasteners or bolts B, the compressive forces act against the sealing section 24, thereby to provide a seal between the cover flange F and engine surface S, a seal produced by the sealing section 24 and enhanced by the auxiliary beads 28, 30. The seal is unaffected by the wire 26 or by the characteristics of the bead 22 because these are not compressed and therefore there is no meaningful relative movement between the elastomer of the bead 28 and the encapsulated rigidifying member 26.

As such, rigidified gaskets 20 of the present invention not only provide an effective seal, but may easily be installed mechanically, as with robots, because they are sufficiently rigid to permit such handling and insertion. Their construction avoids the splitting which would otherwise tend to occur were a rigid member molded within a typical "O" ring-type of sealing element or were a rigid member molded within the sealing member in a location where the elastomer would be worked and would move relative to an encapsulated rigid member.

Although a suitable gasket 20 is shown as having a generally symmetrical T-shaped configuration in cross-section, it is apparent that such a gasket may also be provided with a non-symmetrical T-shape, or even an L-shape, wherein the sealing section 24 has but one leg extending away from the upstanding bead 22. In such a case, the sealing section will still be compressible between the flange F of a cover and a surface S of an engine E and the rigidifying or reinforcing member will be in a location remote from the zone of sealing.

From the foregoing, it will be apparent to those skilled in the art that further modifications may be made and provided without departing from the spirit of the invention. Accordingly, the scope of the invention is to be considered to be limited only to the extent made necessary by the claims.

What is claimed is:

1. A gasket assembly comprising an elongated body having
   a first elongated elastomeric sealing section adapted to be positioned and compressed between an engine and a cover to provide a seal therebetween,
   a second elastomeric rigidifying bead, said section and bead being integrally molded, and said bead being disposed at an angle to said section, and
   a stiffening element fast with said rigidifying bead to rigidify said elongated body, said stiffening element being out of the zone of said sealing section.

2. A gasket assembly in accordance with claim 1, and wherein said body is T-shaped in cross-section, said bead comprising the stem of the "T".

3. A gasket assembly in accordance with claim 2, and wherein said stiffening element is encapsulated within said bead out of the zone of said sealing section.

4. A gasket assembly in accordance with claim 3, and wherein said stiffening element is a reinforcing wire.

5. A gasket assembly in accordance with claim 1, and further comprising auxiliary sealing beads on said sealing section projecting from opposite sides thereof to enhance the sealing effect of said sealing section.

6. A cover and gasket assembly for juxtaposition with a member to be sealed thereby,
   said cover providing a surface defining a sealing flange adapted to confront the surface of a said member to be sealed, said flange surface defining an elongated groove for receiving said gasket assembly,
   said groove comprising a first internal groove section and a second wider groove section intersecting the surface of said flange, said wider groove section defining shoulder means adjacent said internal groove section,
   said gasket assembly comprising an elongated body generally complementary in configuration to said groove and including
   a first elongated elastomeric sealing section adapted to be positioned and compressed between said cover groove shoulder means and a said member to provide a seal therebetween,
   a second elastomeric rigidifying bead, said sealing section and bead being integrally molded, and said bead being disposed at an angle to said sealing section, and
   a stiffening element fast with said rigidifying bead to rigidify said elongated body, said stiffening element being out of the zone of said sealing section.

7. A gasket assembly in accordance with claim 6, and wherein said body and groove are each T-shaped in cross-section, said bead comprising the stem of the "T" of said body.

8. A gasket assembly in accordance with claim 7, and wherein said stiffening element is encapsulated within said bead out of the zone of said sealing section.

9. A gasket assembly in accordance with claim 8, and wherein said stiffening element is a reinforcing wire.

10. A gasket assembly in accordance with claim 6, and further comprising auxiliary sealing beads on said sealing section projecting from opposite sides thereof to enhance the sealing effect of said sealing section.

* * * * *